United States Patent [19]
Shaff

[11] 3,854,705
[45] Dec. 17, 1974

[54] AUTOMATIC DOUGH KNEADER FOR HOME USE

[76] Inventor: Jeanne Mull Shaff, 2 Maple Dr., Roosevelt, N.Y. 11575

[22] Filed: July 17, 1973

[21] Appl. No.: 380,060

[52] U.S. Cl................. 259/185, 259/113, 259/118
[51] Int. Cl............................................. A21c 1/00
[58] Field of Search .......... 259/185, 186, 116, 118, 259/123, 124, 102, 64, 40, 21, 5, DIG. 1, DIG. 20, 117, 111

[56] References Cited
UNITED STATES PATENTS

| | | | |
|---|---|---|---|
| 2,700,534 | 1/1955 | Pegues | 259/118 |
| 2,736,535 | 2/1956 | Clark | 259/102 |
| 2,946,299 | 7/1960 | Clifford | 259/185 |
| 3,169,395 | 2/1965 | Enoch | 259/102 |
| 3,393,900 | 7/1968 | Wagner | 259/111 |

*Primary Examiner*—Robert W. Jenkins
*Attorney, Agent, or Firm*—Jacob L. Kollin

[57] ABSTRACT

A dough kneader machine for home use. The machine comprises a container for dough to be kneaded provided with a lid. A vertical drive shaft extends through the lid into the container. The shaft is driven by an electric motor mounted on the lid. A kneader arm is secured to the shaft and is driven eccentrically in the container. A timing device automatically turns off the motor when the dough has been kneaded.

8 Claims, 5 Drawing Figures

PATENTED DEC 17 1974

AUTOMATIC DOUGH KNEADER FOR HOME USE

The invention relates to dough kneading machines in general and in particular to an automatic dough kneader for home use.

An object of the invention is to provide a device of the above character which will obviate considerable manual effort required in hand kneading of dough.

Another object of the invention is to provide a home dough kneader which will make it possible to knead sufficient dough for a plurality of bread loaves, thus resulting in substantial economy as against the prevalent high cost of commercially prepared bread.

A further object of the invention is to reduce the time usually required for kneading dough by hand.

Yet another object of the invention is to free the homemaker for the performance of other important chores about the home, while dough is being kneaded.

Another object of the invention is to provide a device of the above character which will produce dough of uniform quality.

A further object of the invention is to provide a device of the above character which will simulate functions of the human hands and arms in the kneading of dough.

These and other important objects of the invention will become apparent from the following specification and the accompanying drawing. It is to be understood however, that the embodiment of the invention is given by way of illustration and not of limitation and that various changes in the detail construction may be made within the scope of the invention.

Figure 1:
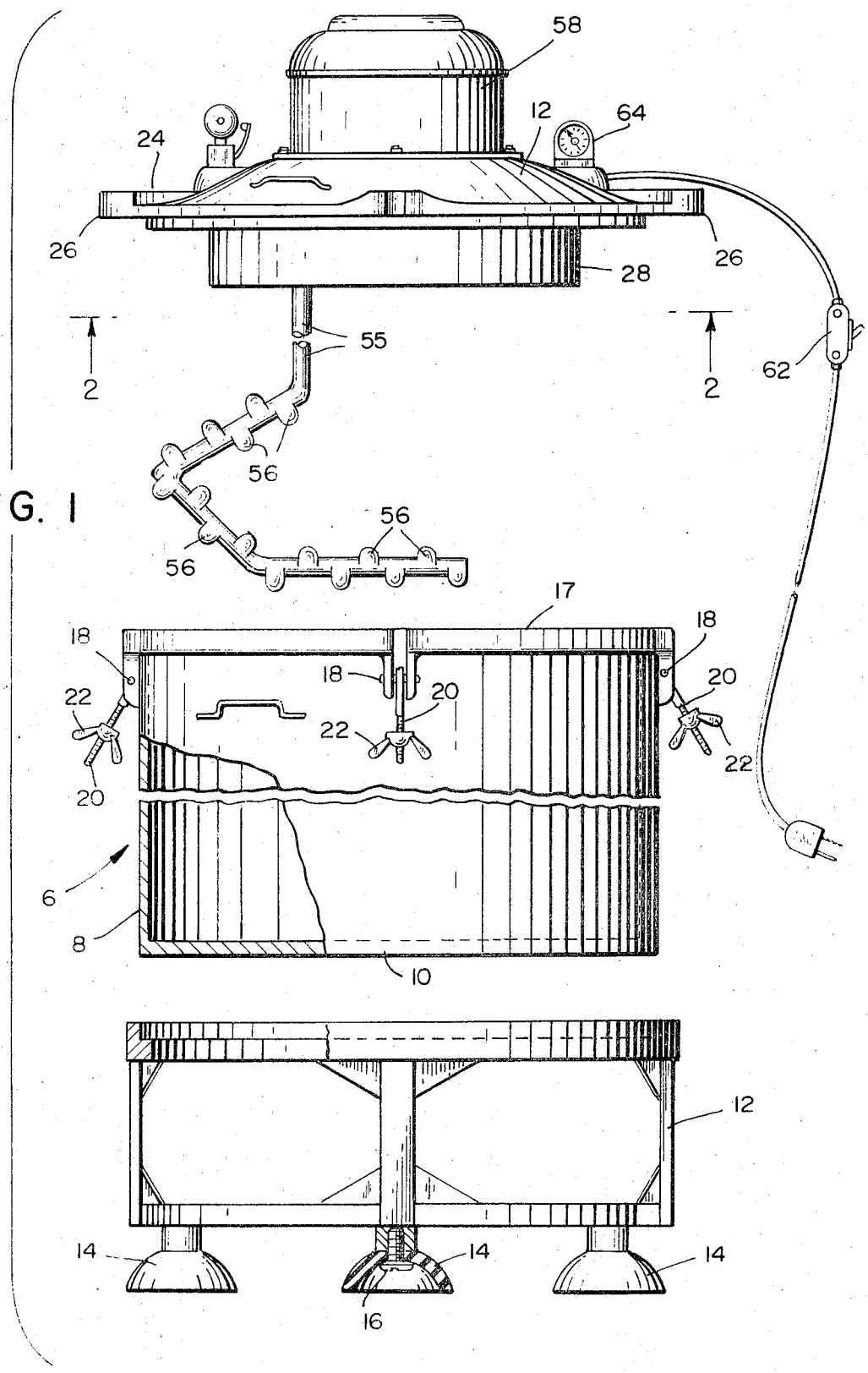
FIG. 1 is an exploded view of the dough kneader.
Figure 2:
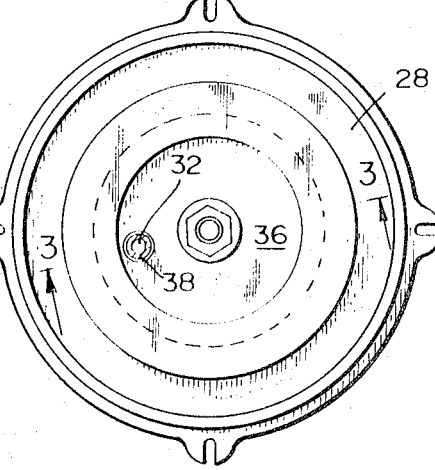
FIG. 2 is a section taken on line 2—2 of FIG. 1.
Figure 4:
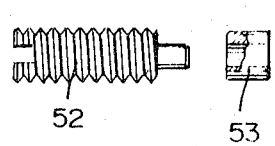
FIG. 4 is an enlarged detail view of a guide element shown in FIG. 3.

Referring now to the drawing in detail, the dough kneader shown in FIG. 1 comprises a container 6 including a circular wall 8 and a bottom 10. A supporting base 12 adapted to receive container 6 is provided with suction cups 14 secured to the bottom of the base by screws 16. The container 6 can thus be used for other purposes when not in use for dough kneading. Secured to the top edge portion 17 of the container on pivots 18 are toggle bolts 20 provided with wing nuts 22 by means of which the lid housing 24 formed with slotted extension 26 is secured in intimate locking engagement liquid-tight to the top edge portion 17 of the container.

Rotatably mounted in the lid housing 24 is a hollow drum 28 secured to a drive shaft 29 mounted in a sleeve bearing 30, the sleeve bearing being integral with the lid housing 24. A vertical shaft 32 is fixedly secured off center to the top of the drum at 34 and extends slightly through and below the bottom 36 of the drum. A hollow shaft 38 is rotatably mounted on stationary shaft 32 and in bearing 40 located in the bottom 36 of the drum. The bearing 40 is provided with a seal 42, thus enabling the drum to hold a lubricant which may be introduced through a fill hole 44. Fixedly secured to the hollow shaft 38 is a gear 46 on which is integrally mounted a cylindrical cam member 48 slidable vertically on the stationary shaft 32. The cam member is formed with a spiral groove 50. The gear 46 is in meshing engagement with an elongated gear 49 which is fixedly mounted on sleeve bearing 30. An adjustable guide screw 52 provided with a roller 53 is mounted in the drum wall 54 and engages with the spiral groove 50 of the cam member 48. Upon adjustment the screw is locked by nut 55. Thus, upon rotation of the drum 28, the gear 46 and with it cam member 48 are caused to rotate. At the same time the gear 46 and with it the cam member 48 are repeatedly displaced upward and downward due to the coaction of the guide screw 52 with the cam member's groove 50. The hollow shaft 38 thus executes a limited back and forth and upward and downward movement, as well as a circular movement with relation to the axis of shaft 30.

The hollow shaft 38, extends in an angular shape as a kneader arm 54 formed with alternate, opposed semi-spherical "knuckles" 56 about its periphery. In operation the arm executes a movement similar to that executed by a pair of hands when manually kneading dough. The hollow shaft 38 can be detached from gear 46 for cleaning the kneader arm.

Figure 3:
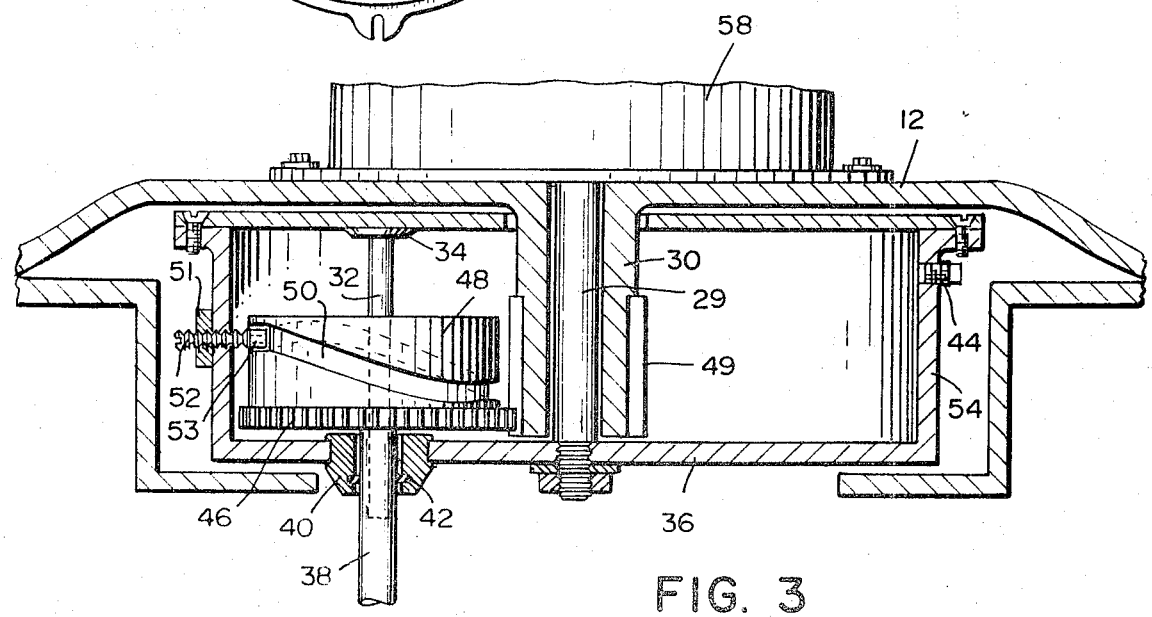
FIG. 3 is a section taken on line 3—3 of FIG. 2.
Figure 5:
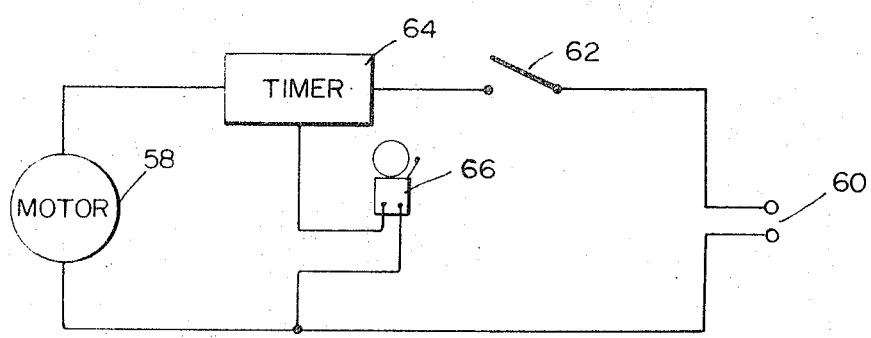
FIG. 5 illustrates the electrical circuit employed in the dough kneader.

The drum 28 is driven by a motor 58 (shwon in part in FIG. 3) operated from a source of household electric power through a circuit including an off-and-on switch 62, a timer 64 in series with the motor and a sound signaling device, such as a bell 66, or the like connected in parallel with motor 58.

To operate the kneader, the water, flower, yeast and other ingredients are placed in the container. The container lid is locked in place using the locking means. The timer is set for the desired operating time. The switch 62 is turned to the "on" position. Upon completion of the kneading indicated by the audible signal, the switch 62 is turned back to the off position. The connecting cord, it should be noted, should be of ample length, for convenience.

What I claim is:

1. A dough kneading machine for home use comprising, in combination, a container for dough to be kneaded, said container having a closed bottom, an open top and wall portions, a lid for said container, means for securing said lid to said open top portion, a sleeve bearing extending downwardly from said lid centrally of said lid, a drive shaft rotatable in said sleeve bearing, a motor mounted on said lid for driving said drive shaft, a closed drum housing having a wall, top and bottom secured to said drive shaft, a kneader arm mounted in said drum housing eccentrically of said drive shaft, said kneader arm extending into said container, and cam means in said drum housing for simultaneously operating said kneading arm in a cirular and vertically reciprocating paths during the rotation of said drum housing.

2. The device as claimed in claim 1, further provided with a downwardly extending cylindrical rod secured to the lid eccentrically of said sleeve bearing, said kneader arm having a tubular upper end portion slidably reciprocable on said cylindrical rod.

3. The device as claimed in claim 2, wherein the outer wall surface of said sleeve is formed as an elongated fixed pinion gear, said cam means comprising a horizontal gear secured interiorly of said closed drum to said tubular upper end portion of said kneader arm and engageable with said fixed gear, a cylindrical cam member secured to said horizontal gear, the wall of said cam member having a spiral groove, a guide element mounted in the wall of said drum and extending into said spiral groove for imparting a vertically reciprocating movement to said cam upon rotation of said drum.

4. The device according to claim 3, wherein said guide element is an adjustable screw provided with a roller engaging with said spiral groove.

5. The device according to claim 3, wherein said kneader arm has a bottom angular horizontal portion and a plurality of semi-spherical knuckles spaced about said angular horizontal portion, whereby upon operation of the device, said kneader arm simulates a kneading movement of human hands and arms.

6. The device as claimed in claim one further provided with a detachable support base, said base being provided with suction cups for mounting said base on a supporting surface.

7. The device according to claim 1, further provided with a timing means for controlling the operational span of kneading.

8. The device as claimed in claim 1, further provided with audible signal means for indicating the end of a kneading span.

* * * * *